(No Model.)

G. W. TROXLER.
PISTON ROD PACKING.

No. 567,208. Patented Sept. 8, 1896.

Witnesses
Henry F. Hills
K. A. Nau

Inventor
George W. Troxler
By John Wedderburn
his Attorney

UNITED STATES PATENT OFFICE.

GEORGE W. TROXLER, OF RICHMOND, VIRGINIA.

PISTON-ROD PACKING.

SPECIFICATION forming part of Letters Patent No. 567,208, dated September 8, 1896.

Application filed May 11, 1896. Serial No. 591,115. (No model.)

*To all whom it may concern:*

Be it known that I, GEORGE W. TROXLER, a citizen of the United States, residing at Richmond, in the county of Henrico and State of Virginia, have invented certain new and useful Improvements in Piston-Rod Packing; and I do hereby declare the following to be a full, clear, and exact description of the invention, such as will enable others skilled in the art to which it appertains to make and use the same.

This invention relates to certain new and useful improvements in piston-rod packing; and it has for its object, among others, to provide a simple and cheap construction of packing for piston-rods and valve-stems which shall be easy to adjust.

The rings are formed with bores. The wear always being on the thickest side of the rings, it will not wear out as rapidly as ordinary packing, and less friction will be caused on the rod.

The packing is composed of few parts, those readily assembled, and can be manufactured and kept in repair at a minimum cost. The rings are solid, so there is less chance of leakage of steam past the rings. At the same time they have a bearing against the casing, which prevents leakage of steam at that point. The pressure of the packing on the piston-rod is perfectly distributed and equal on all parts of the stem.

Other objects and advantages of the invention will hereinafter appear, and the novel features thereof will be particularly pointed out in the appendid claims.

The invention is clearly illustrated in the accompanying drawings, which, with the letters of reference marked thereon, form a part of this specification, and in which—

Figure 1:
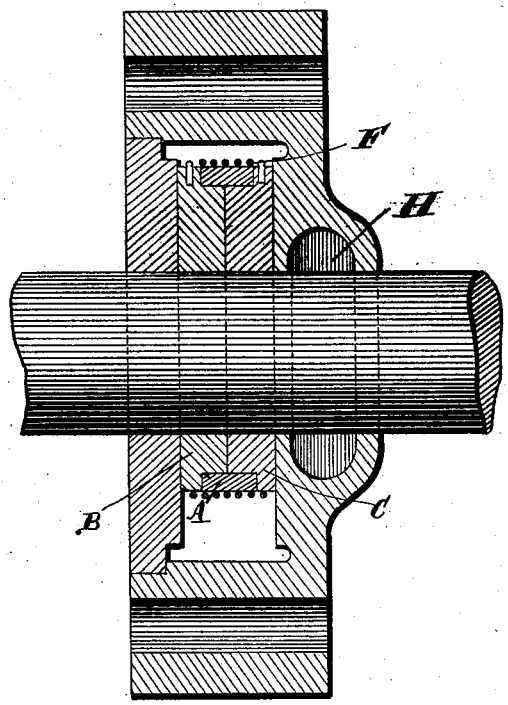
Figure 2:
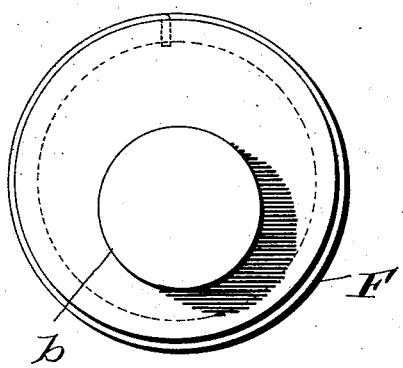
Figure 3:
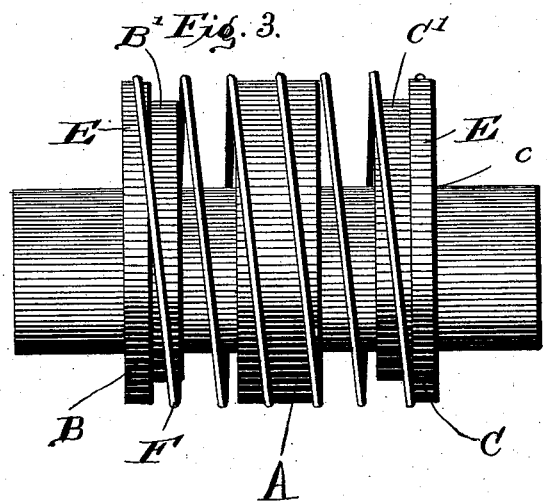

Figure 1 is a section showing the application of the invention. Fig. 2 is an end elevation. Fig. 3 shows the rings separated.

Like letters of reference indicate like parts in the several views.

Referring now to the details of the drawings by letter, A designates the metallic casing and ring within which the eccentric flanges of the rings B and C are fitted. These rings B and C have the eccentric bores $b$ $c$, respectively, and the bores extend through the flanges B' C', extending in the direction of the length of the shaft, while the peripheral flanges E are designed to engage opposite faces of the central ring and to lie practically flush therewith.

F is a spring-wire embracing the outer periphery of the rings, with one end bent at a right angle and held in an opening in the flange E of one ring, and after encircling the central ring the required number of times the other end is bent at a right angle and received and held in an opening in the flange E of the opposite ring. This spring serves to normally force the rings outward, so as to insure a tight joint. It is compressible with the compression of the packing-rings. These outer flanged rings may be of any desired material, preferably of composition suitable for the purpose, and the construction is such that the tension of the spring tends always to draw the thick side of the rings to the piston or valve rod, and this compensates for wear and at the same time forms a tight joint around the rod and constitutes an absolutely tight joint.

Provision is made for the oiling of the piston or valve rod by means of a recess H, as seen in Fig. 1, in which view is also shown the application of the packing to the piston.

Modifications in details may be resorted to without departing from the spirit of the invention or sacrificing any of its advantages.

Having thus described the invention, what is claimed as new is—

1. A piston-rod packing comprising a central ring, eccentrically-bored flanged rings, the flanges of which fit within the central ring and a spring encircling the central ring and secured to the outer one, substantially as described.

2. The piston-rod packing described, comprising the central metallic ring, the oppositely-disposed rings with longitudinal eccentrically-bored portions and peripheral flanges, and a spring encircling the central ring with its ends secured to the peripheral flanges of the outer ring, substantially as described.

In testimony whereof I have signed this specification in the presence of two subscribing witnesses.

GEORGE W. TROXLER.

Witnesses:
E. F. SEAL,
E. T. KEETON.